United States Patent
Morisaki (10) Patent No.: US 10,632,547 B2
(45) Date of Patent: Apr. 28, 2020

(54) CUTTING INSERT AND CUTTING TOOL

(71) Applicant: SUMITOMO ELECTRIC HARDMETAL CORP., Itami-shi (JP)

(72) Inventor: Yuta Morisaki, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 0 days.

(21) Appl. No.: 16/073,004

(22) PCT Filed: Mar. 1, 2017

(86) PCT No.: PCT/JP2017/008102
§ 371 (c)(1),
(2) Date: Jul. 26, 2018

(87) PCT Pub. No.: WO2017/150608
PCT Pub. Date: Sep. 8, 2017

(65) Prior Publication Data
US 2019/0030626 A1 Jan. 31, 2019

(30) Foreign Application Priority Data
Mar. 3, 2016 (JP) .................. 2016-041176

(51) Int. Cl.
B23B 27/16 (2006.01)
B23C 5/02 (2006.01)
B23C 5/06 (2006.01)
B23C 5/20 (2006.01)
B23B 27/22 (2006.01)

(52) U.S. Cl.
CPC .................. *B23C 5/06* (2013.01); *B23C 5/20* (2013.01); *B23C 5/207* (2013.01); *B23B 27/22* (2013.01);
(Continued)

(58) Field of Classification Search
CPC ........... Y10T 408/5586; Y10T 408/909; Y10T 408/9093; Y10T 407/1908; Y10T 407/191;
(Continued)

(56) References Cited

U.S. PATENT DOCUMENTS

| 5,382,118 A | 1/1995 | Satran et al. |
| 6,227,772 B1 * | 5/2001 | Heinloth ................. B23C 5/202 407/113 |

(Continued)

FOREIGN PATENT DOCUMENTS

| CN | 101720265 A | 6/2010 |
| JP | 2007-125669 A | 5/2007 |

(Continued)

*Primary Examiner* — Nicole N Ramos
(74) *Attorney, Agent, or Firm* — Baker Botts L.L.P.; Michael A. Sartori (57) ABSTRACT

A cutting insert includes a main body including a first face, a second face, and a third face. The second face includes a rake face. Among the outer-peripheral sides of the second face, the boundary portion with the first face is a main cutting edge. When viewed from the side where the first face is disposed, the main cutting edge includes a first straight portion, a second straight portion, and a curved portion. The first straight portion is located adjacent to a reference side. The second straight portion is arranged at a distance from the first straight portion. The curved portion connects the first straight portion and the second straight portion. A first intersection angle of the first straight portion with respect to the reference side is different from a second intersection angle of the second straight portion with respect to the reference side.

9 Claims, 6 Drawing Sheets

(52) U.S. Cl.
CPC .......................... *B23C 2200/0416* (2013.01);
*B23C 2200/083* (2013.01); *B23C 2200/085* (2013.01)

(58) Field of Classification Search
CPC ........... Y10T 407/192; Y10T 407/1924; Y10T 407/1932; Y10T 407/1934; Y10T 407/1936; Y10T 407/1942; Y10T 407/227; Y10T 407/23; B23C 2200/0433; B23C 2200/361; B23C 2200/367; B23C 2200/41; B23C 2200/086; B23C 2200/164; B23C 2200/205; B23C 2200/208; B23C 2210/168; B23C 2210/086; B23C 5/06; B23C 5/22211; B23C 5/04; B23C 5/213
See application file for complete search history.

(56) References Cited

U.S. PATENT DOCUMENTS

| | | | |
|---|---|---|---|
| 6,238,146 B1 * | 5/2001 | Satran | ................. B23B 27/1614 407/113 |
| 8,202,026 B2 * | 6/2012 | Satran | ..................... B23C 5/207 407/113 |
| 2016/0144438 A1 | 5/2016 | Yamamichi | |

FOREIGN PATENT DOCUMENTS

| | | |
|---|---|---|
| JP | 2013-121636 A | 6/2013 |
| WO | 2008/153233 A1 | 12/2008 |
| WO | 2014/208513 A1 | 12/2014 |

* cited by examiner

CUTTING INSERT AND CUTTING TOOL

TECHNICAL FIELD

The present invention relates to a cutting insert and a cutting tool.

The present application claims priority to Japanese Patent Application No. 2016-041176 filed on Mar. 3, 2016, the disclosure of which is hereby incorporated by reference in its entirety.

BACKGROUND ART

A cutting insert and a cutting tool for shoulder milling have conventionally been known (see, for example, Japanese Patent Laying-Open No. 2013-121636). A main cutting edge is formed at the boundary portion between a first face, in which a hole for fixing the cutting insert is formed, and a second face, which is a lateral face adjacent to the first face. The main cutting edge may form a circular arc or a straight line when viewed from the first face side.

CITATION LIST

Patent Document

PTD 1: Japanese Patent Laying-Open No. 2013-121636

SUMMARY OF INVENTION

A cutting insert according to one aspect of the present invention includes a main body including a first face, a second face, and a third face. The second face is continuous with the first face and extends in a direction intersecting the first face. The third face is continuous with the first face and the second face. The first face has a fixing hole formed therein. The second face includes a rake face. Among the outer-peripheral sides of the second face, the boundary portion with the first face is a main cutting edge. When viewed from the side where the first face is disposed, the main cutting edge includes a first straight portion, a second straight portion, and a curved portion. The first straight portion is located adjacent to a reference side, the reference side being the boundary between the first face and the third face. The second straight portion is arranged at a distance from the first straight portion. The curved portion connects the first straight portion and the second straight portion. A first intersection angle of the first straight portion with respect to the reference side is different from a second intersection angle of the second straight portion with respect to the reference side.

DESCRIPTION OF EMBODIMENTS

[Problems to be Solved by the Disclosure]

In the above-described cutting insert, the boundary between a third face, which is continuous with the first and second faces, and the first face is taken as a reference side. In this case, a relative increase in intersection angle of the main cutting edge with respect to the reference side can enhance the edge strength of the main cutting edge. In this case, however, the inclination angle of the cutting edge may relatively decrease or may be negative. In such a case, the cutting performance (sharpness) of the cutting insert may decline.

A relative decrease in the intersection angle, on the other hand, relatively increases the inclination angle of the cutting edge, and thus can enhance the cutting performance of the cutting insert. In this case, however, the edge strength of the main cutting edge may decrease. Thus, it is difficult for a conventional cutting insert to achieve both good cutting performance and high edge strength.

In view of the above, an object is to provide a cutting insert and a cutting tool that can achieve both high cutting performance and edge strength.

[Advantageous Effects of the Disclosure]

According to the present disclosure, a cutting insert and a cutting tool can be provided that can achieve both high cutting performance and edge strength.

[Description of Embodiments of the Invention]

First of all, embodiments of the present disclosure are listed and described below.

A cutting insert according to one aspect of the present disclosure is (1) a cutting insert 1 including a main body, the main body including a first face 2, a second face 4, and a third face 8. Second face 4 is continuous with first face 2 and extends in a direction intersecting first face 2. Third face 8 is continuous with first face 2 and second face 4. First face 2 has a fixing hole 32 formed therein. Second face 4 includes a rake face. Among the outer-peripheral sides of second face 4, the boundary portion with first face 2 is a main cutting edge 6. When viewed from the first face 2 side, main cutting edge 6 includes a first straight portion 6a, a second straight portion 6d, and a curved portion. First straight portion 6a is located adjacent to a reference side 11, reference side 11 being the boundary between first face 2 and the third face. Second straight portion 6d is arranged at a distance from first straight portion 6a. The curved portion connects first straight portion 6a and second straight portion 6d. A first intersection angle θ1 of first straight portion 6a with respect to reference side 11 is different from a second intersection angle θ2 of second straight portion 6d with respect to reference side 11.

Thus, main cutting edge 6 can be formed in such a way that, when viewed from the first face 2 side, main cutting edge 6 includes first and second straight portions 6a, 6d having different intersection angles θ1, θ2 with respect to reference side 11, instead of being uniform over the entire width (e.g. forming a straight line). This offers a great degree of freedom in adjusting the shape of main cutting edge 6 for enhancing both cutting performance and edge strength. Accordingly, cutting insert 1 having enhanced cutting performance and edge strength can be provided by adjusting the shape of main cutting edge 6. Further, it is possible for the main cutting edge to have a smooth shape with no corner portion as a whole, and therefore, problems due to the presence of such a corner portion, such as a rough cutting face of a workpiece, can be prevented.

(2) In cutting insert 1 described above, when viewed from the first face 2 side, the curved portion may include: a first curved sub-portion 6b convex in the direction away from fixing hole 32; and a second curved sub-portion 6c convex toward fixing hole 32.

This allows the connection portion between first straight portion 6a and second straight portion 6d to form a smooth curved line. Accordingly, the stress concentration at the connection portion can be reduced compared to the case where the connection portion includes a corner portion. Consequently, the durability of the connection portion can be enhanced.

(3) In cutting insert 1 described above, when viewed from the first face 2 side, first curved sub-portion 6b and second curved sub-portion 6c may be different from each other in curvature radius.

In this case, the positions of the both ends of the curved portion can be set arbitrarily by adjusting the two curvature radii as appropriate. Accordingly, even if the directions in which the first straight portion and the second straight portion extend are individually changed, the first straight portion and the second straight portion can be easily connected to each other with the curved portion.

(4) In cutting insert 1 described above, first face 2 may include a flank face 31 continuous with main cutting edge 6. In flank face 31, a first width W4 of the portion adjacent to first straight portion 6a in the direction along reference side 11 may be different from a second width W5 of the portion adjacent to second straight portion 6d in the direction along reference side 11.

In this case, if first straight portion 6a and second straight portion 6d have different cutting conditions because of extending in different directions, the widths of flank face 31 can be adjusted according to the respective cutting conditions. Thus, high cutting performance can be provided.

(5) In cutting insert 1 described above, as shown in FIG. 6, main cutting edge 6 may form a curved line when viewed from the second face 4 side. When viewed from the second face 4 side, the center C of the curvature radius of main cutting edge 6 may be located on the third face 8 side relative to fixing hole 32. In this case, too, high cutting performance can be provided.

(6) In cutting insert 1 described above, the difference between first intersection angle θ1 and second intersection angle θ2 may be 1° or more and 5° or less. In this case, the curvature radius of the curved portion can be large to some degree, and therefore first straight portion 6a and second straight portion 6d can be smoothly connected to each other. Consequently, a rough cutting face of a workpiece can be prevented.

(7) In cutting insert 1 described above, first intersection angle θ1 may be 80° or more and 85° or less. In this case, in main cutting edge 6, sufficiently high strength can be provided to the edge of the area located adjacent to the boundary portion between first straight portion 6a and reference side 11. Also, first intersection angle θ1 may be larger than second intersection angle θ2. In this case, sufficiently high strength can be provided to the edge of the area located adjacent to the boundary portion between first straight portion 6a and reference side 11, and also, the inclination angle of the cutting edge of second straight portion 6d can be larger than that of first straight portion 6a. Consequently, cutting performance can be enhanced. The inclination angle here refers to an angle made by a line perpendicular to a workpiece surface and the cutting edge at the time of cutting the workpiece with cutting insert 1.

A cutting insert according to one aspect of the present disclosure is (8) cutting insert 1 including a main body, the main body including first face 2, second face 4, and third face 8. Second face 4 is continuous with first face 2 and extends in a direction intersecting first face 2. Third face 8 is continuous with first face 2 and second face 4. First face 2 has fixing hole 32 formed therein. Second face 4 includes a rake face. Among the outer-peripheral sides of second face 4, the boundary portion with first face 2 is main cutting edge 6. When viewed from the first face 2 side, main cutting edge 6 includes first straight portion 6a, second straight portion 6d, and curved portion. First straight portion 6a is located adjacent to reference side 11, reference side 11 being the boundary between first face 2 and the third face. Second straight portion 6d is arranged at a distance from first straight portion 6a. The curved portion connects first straight portion 6a and second straight portion 6d. First intersection angle θ1 of first straight portion 6a with respect to reference side 11 is larger than second intersection angle θ2 of second straight portion 6d with respect to reference side 11. First face 2 includes flank face 31 continuous with main cutting edge 6. In flank face 31, first width W4 of the portion adjacent to first straight portion 6a in the direction along reference side 11 is different from second width W5 of the portion adjacent to second straight portion 6d in the direction along reference side 11.

A cutting tool 20 according to one aspect of the present disclosure includes (9) a cutter body 21 having an outer periphery, and cutting insert 1 according to any one of the above (1)-(8). Cutting insert 1 is fixed to the outer periphery. Thus, with cutting insert 1 having both high edge strength and high cutting performance, cutting tool 20 can be provided that can perform highly efficient cutting with a large depth of cut at the time of cutting.

[Details of Embodiments of the Invention]

In the following, one embodiment of the present disclosure (hereinafter also referred to as "present embodiment") will be described. It should be noted, however, that the present embodiment is not limited to the following description.

(Embodiment 1)

<Configuration of Cutting Insert>

A configuration of a cutting insert according to the present embodiment is described with reference to FIGS. 1-6.

Figure 1:
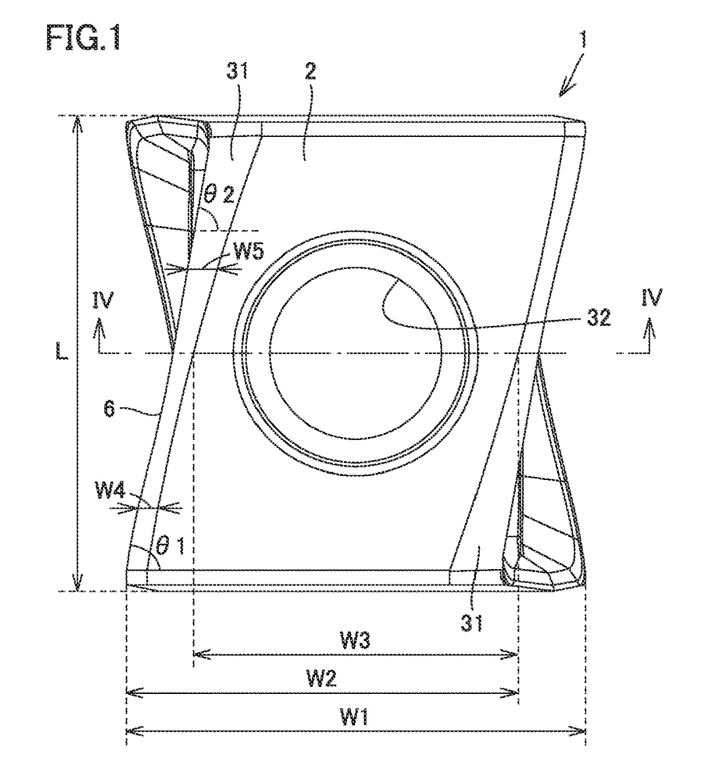
FIG. 1 is a front schematic view of a cutting insert according to Embodiment 1.

Cutting insert 1 shown in FIGS. 1-6 includes a main body including first face 2, second face 4, and third face 8. As shown in FIG. 1, first face 2 as an upper face is substantially a parallelogram in shape in plan view. Lower face 3 located opposite to first face 2 is basically the same as first face 2 in shape.

Figure 2:
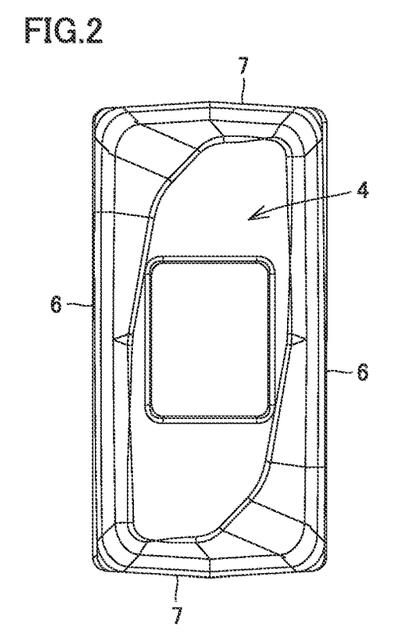
FIG. 2 is a lateral schematic view of the cutting insert shown in FIG. 1.
Figure 3:
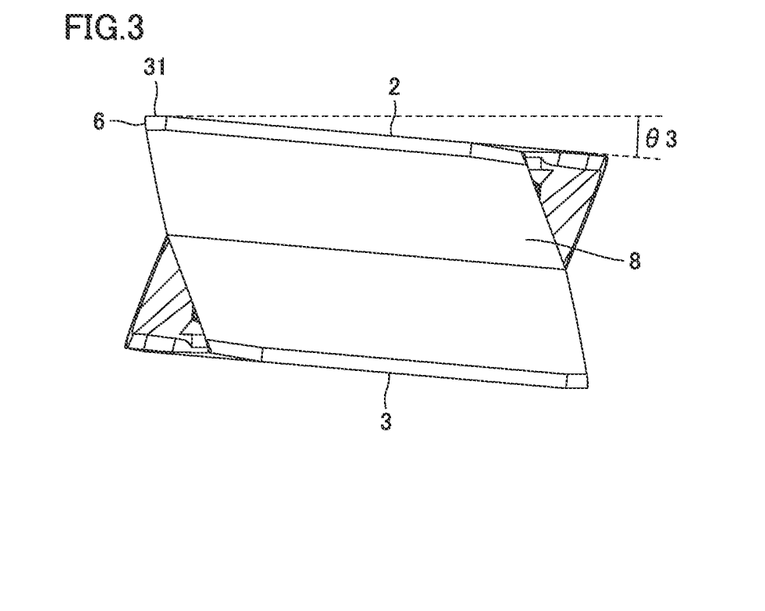
FIG. 3 is a bottom schematic view of the cutting insert shown in FIG. 1.

Second face 4 as a lateral face is continuous with first face 2 and extends in a direction intersecting first face 2. As shown in FIG. 2, second face 4 is substantially rectangular in shape in plan view. Third face 8 is continuous with first face 2 and second face 4. As shown in FIG. 3, third face 8 is substantially a parallelogram in shape in plan view. As can be seen from FIGS. 1-3, third face 8 is constituted of two inclined faces arranged in such a way that the central portion protrudes.

Figure 4:
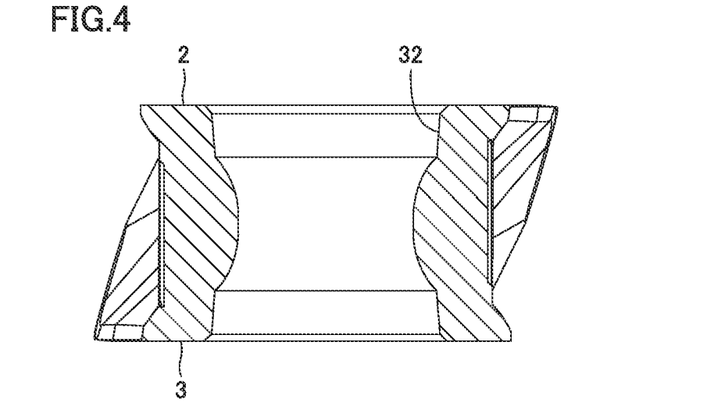
FIG. 4 is a cross-sectional schematic view taken along the line segment Iv-Iv of FIG. 1.

First face 2 has fixing hole 32 formed therein. Fixing hole 32 is formed substantially in the central portion of first face 2. As shown in FIG. 4, fixing hole 32 is formed in such a way as to extend from first face 2 to lower face 3 through the main body. As described later, an attaching screw is inserted through fixing hole 32 for fixing cutting insert 1 to the cutter body of the cutting tool.

Among the outer-peripheral sides of second face 4, the boundary portion with first face 2 is main cutting edge 6. Each of the two opposed long sides of first face 2 is main cutting edge 6. As shown in FIG. 2, among the outer-peripheral sides of second face 4, the boundary portion with lower face 3 is also another main cutting edge 6. As shown in FIG. 1, among the outer-peripheral sides of second face 4, main cutting edge 6 at the boundary portion with first face 2 and another main cutting edge 6 at the boundary portion with lower face 3 are formed in such a way as to extend in directions intersecting each other. Cutting insert 1 has four main cutting edges 6.

Figure 5:
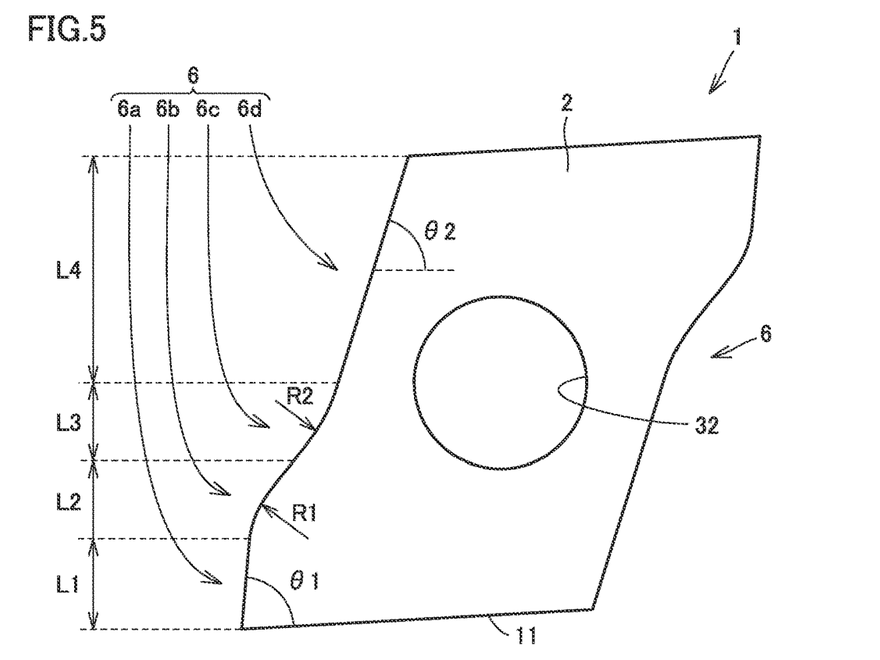
FIG. 5 is a schematic view for illustrating a configuration of the main cutting edge of the cutting insert shown in FIG. 1.

As shown in FIG. 5, when viewed from the first face 2 side, main cutting edge 6 includes first straight portion 6a, second straight portion 6d, and curved portion. First straight portion 6a is located adjacent to reference side 11, reference side 11 being the boundary between first face 2 and third face 8. Among the outer-peripheral sides of second face 4, a portion continuous with first straight portion 6a (i.e., a short side) is a sub cutting edge 7. Main cutting edge 6 and sub cutting edge 7 are connected to each other with a connection portion (nose portion) that forms a curved line. Second face 4 includes a rake face at a portion adjacent to main cutting edge 6 or sub cutting edge 7. When cutting a workpiece with cutting insert 1, the first straight portion 6a side of main cutting edge 6 is first put into a surface of the workpiece. Second straight portion 6d is arranged at a distance from first straight portion 6a. That is, second straight portion 6d is arranged at a position remoter from reference side 11 than first straight portion 6a is. The curved portion connects first straight portion 6a and second straight portion 6d.

When viewed from the first face 2 side, the curved portion includes first curved sub-portion 6b that is convex in the direction away from fixing hole 32, and second curved sub-portion 6c that is convex toward fixing hole 32. That is, the curved portion includes two first curved sub-portion 6b and second curved sub-portion 6c that are convex in directions opposite to each other. Note that, although the above-described curved portion includes two curved sub-portions, it may include three or more, or four or more curved sub-portions. When viewed from the first face 2 side, curvature radius R1 of first curved sub-portion 6b and curvature radius R2 of second curved sub-portion 6c may be different from each other or may be the same. Similarly, in the case where the curved portion includes three or more curved sub-portions, the respective curvature radii of the curved sub-portions may be different from each other or may be the same.

As shown in FIGS. 1 and 5, first intersection angle θ1 of first straight portion 6a with respect to reference side 11 is different from second intersection angle θ2 of second straight portion 6d with respect to reference side 11. Specifically, the difference between first intersection angle θ1 and second intersection angle θ2 is 1° or more and 5° or less. Also, the difference may be 4° or less, or 3° or less. Also, the difference may be 2° or more. First intersection angle θ1 is 80° or more and 85° or less. Also, first intersection angle θ1 may be 84° or less, or 83° or less. Also, first intersection angle θ1 may be 81° or more, or 82° or more.

As shown in FIG. 1, first face 2 includes flank face 31 continuous with main cutting edge 6. In flank face 31, first width W4 of the portion adjacent to first straight portion 6a in the direction along reference side 11 is different from second width W5 of the portion adjacent to second straight portion 6d in the direction along reference side 11. Although second width W5 is larger than first width W4 in cutting insert 1 shown in FIG. 1, flank face 31 may be formed in such a way that second width W5 is smaller than first width W4. Alternatively, flank face 31 may be formed in such a way that first width W4 and second width W5 are the same. As shown in FIG. 3, the direction in which flank face 31 extends intersects the direction in which the central portion of first face 2 where fixing hole 32 is formed extends. Intersection angle θ3 between the direction in which flank face 31 extends and the direction in which the central portion of first face 2 extends is, for example, 5°. Intersection angle θ3 may be, for example, 1° or more and 10° or less. The lower limit of intersection angle θ3 may be 2° or 3°. The upper limit of intersection angle θ3 may be 9° or 8°.

Figure 6:
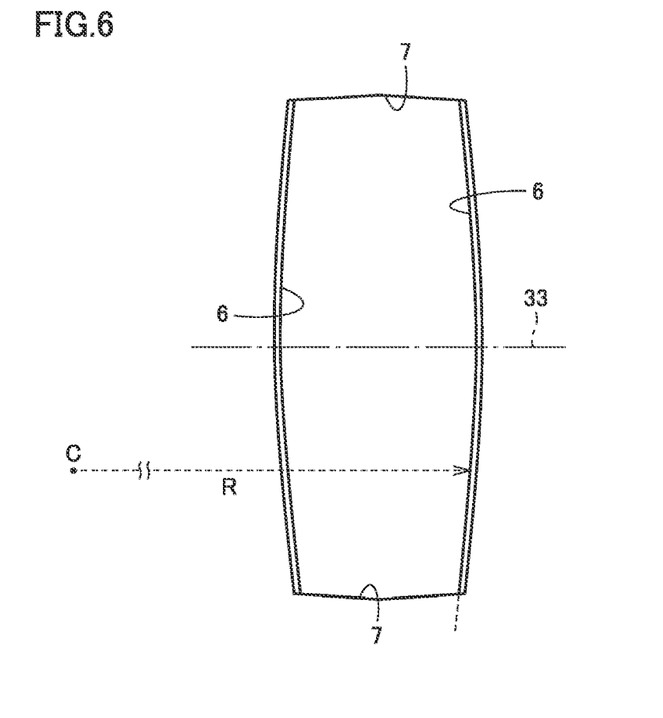
FIG. 6 is a schematic view for illustrating a configuration of the main cutting edge of the cutting insert shown in FIG. 1.
Figure 7:
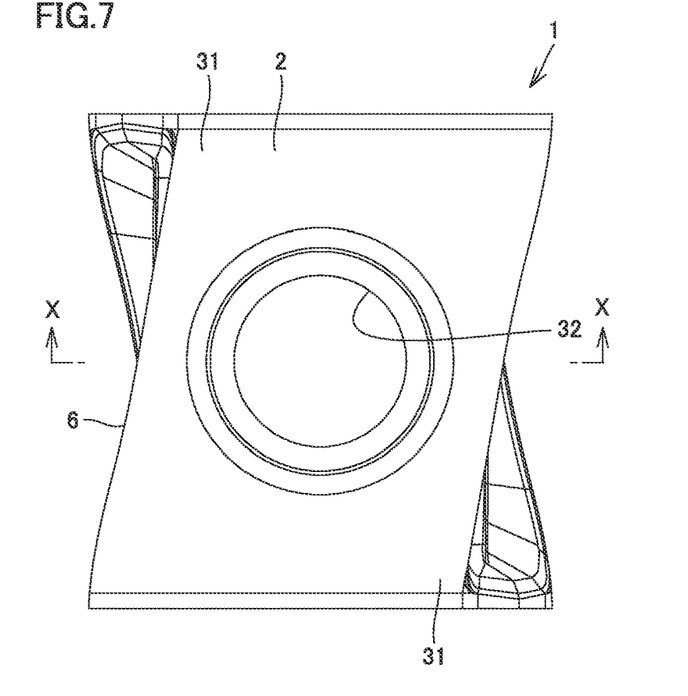
FIG. 7 is a front schematic view of a cutting insert according to Embodiment 2.
Figure 8:
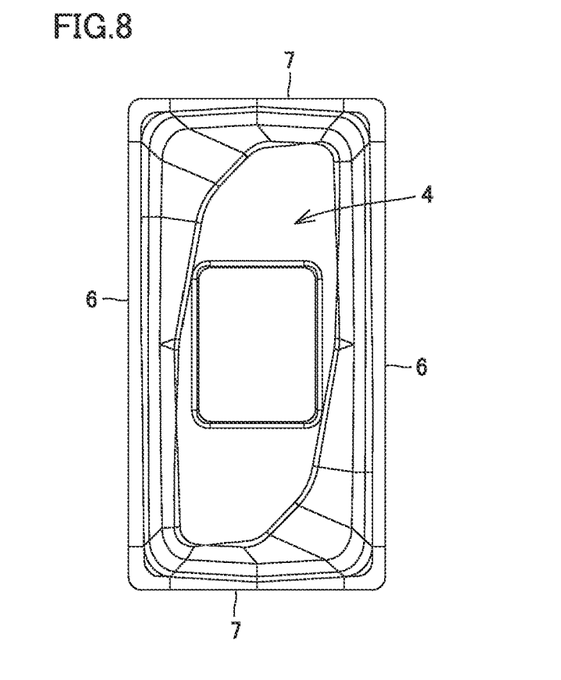
FIG. 8 is a lateral schematic view of the cutting insert shown in FIG. 7.
Figure 9:
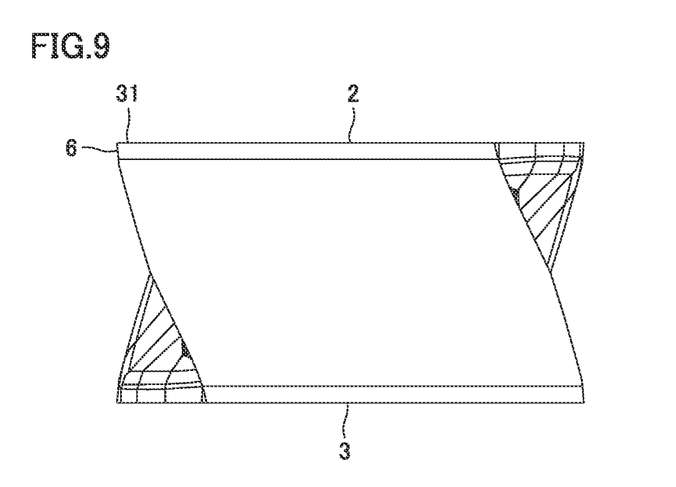
FIG. 9 is a bottom schematic view of the cutting insert shown in FIG. 7.
Figure 10:
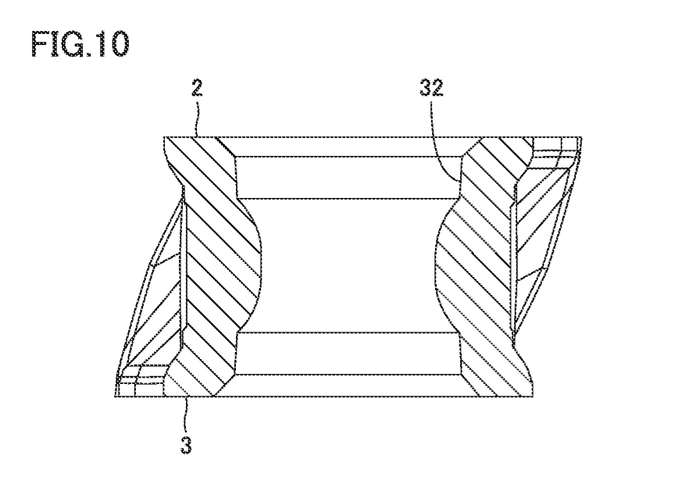
FIG. 10 is a cross-sectional schematic view taken along the line segment X-X of FIG. 7.

As shown in FIG. 6, in cutting insert 1 described above, main cutting edge 6 may form a curved line when viewed from the second face 4 side. When viewed from the second face 4 side, center C of the curvature radius of main cutting edge 6 may be located on the third face 8 side relative to fixing hole 32. More specifically, center C of the curvature radius is located at an area closer to first straight portion 6a than to second straight portion 6d of main cutting edge 6.

In cutting insert 1 shown in FIG. 1, width W1 is the maximum width of cutting insert 1 in the direction along the reference side when viewed from the first face 2 side. Width W1 may be, for example, 10 mm or more and 20 mm or less. Width W2 shown in FIG. 1 is the distance from the connection portion between main cutting edge 6 and sub cutting edge 7 to the boundary between flank face 31 and the central portion of first face 2 at the central portion of main cutting edge 6, in the direction along the reference side when viewed from the first face side. Width W2 may be, for example, 8 mm or more and 18 mm or less. Width W3 shown in FIG. 1 is the width of the central portion of first face 2 in the direction along the reference side, in the central portion of first face 2. Width W3 may be, for example, 7 mm or more and 17 mm or less. Length L in FIG. 1 is the length of cutting insert 1 in the direction perpendicular to the reference side. Length L may be, for example, 10 mm or more and 20 mm or less.

As shown in FIG. 5, length L1 of first straight portion 6a in the direction perpendicular to reference side 11 may be, for example, 1 mm or more and 3 mm or less. Length L2 of first curved sub-portion 6b in the direction perpendicular to reference side 11 may be, for example, 1 mm or more and 5 mm or less. Length L3 of second curved sub-portion 6c in the direction perpendicular to reference side 11 may be, for example, 1 mm or more and 7 mm or less. Length L4 of second straight portion 6d in the direction perpendicular to reference side 11 may be, for example, 5 mm or more and 17 mm or less.

Further, curvature radius R1 of first curved sub-portion 6b shown in FIG. 5 may be, for example, 10 mm or more and 30 mm or less, and curvature radius R2 of second curved sub-portion 6c may be, for example, 20 mm or more and 60 mm or less.

<Advantageous Effects of Cutting Insert>

In cutting insert 1 shown in FIGS. 1-6, main cutting edge 6 is formed in such a way that, when viewed from the first face 2 side, main cutting edge 6 includes first and second straight portions 6a, 6d having different intersection angles $\theta 1$, $\theta 2$ with respect to reference side 11. This offers a great degree of freedom in adjusting the shape of main cutting edge 6 for enhancing both cutting performance and edge strength. Specifically, as shown in FIG. 5, first intersection angle $\theta 1$ at first straight portion 6a adjacent to the reference side is larger than second intersection angle $\theta 2$ at second straight portion 6d. Accordingly, the edge strength of the end portion of first straight portion 6a can be enhanced compared to the case where the entire main cutting edge 6 forms a straight line parallel to second straight portion 6d.

Further, since second intersection angle $\theta 2$ of second straight portion 6d is smaller than first intersection angle $\theta 1$ of first straight portion 6a, decline in cutting performance can be prevented in the case of, for example, a large depth of cut. That is, in cutting under tough conditions, such as a large depth of cut, durability and high cutting performance of cutting insert 1 can be insured.

Further, as shown in FIG. 5, first straight portion 6a and second straight portion 6d are connected to each other with a curved portion, thus allowing the main cutting edge to have a smooth shape with no corner portion as a whole. Therefore, problems due to the presence of such a corner portion, such as a rough cutting face of a workpiece, can be prevented.

Further, as shown in FIG. 5, the curved portion includes first curved sub-portion 6b and second curved sub-portion 6c that are convex in directions opposite to each other. This allows the connection portion between first straight portion 6a and second straight portion 6d to form a smooth curved line. Accordingly, the stress concentration at the connection portion can be reduced compared to the case where the connection portion includes a corner portion. Consequently, the durability of the connection portion can be enhanced.

Further, curvature radius R1 of first curved sub-portion 6b and curvature radius R2 of second curved sub-portion 6c can be set differently from each other. In this case, the positions of the both ends of the curved portion can be set arbitrarily by adjusting the two curvature radii R1, R2 as appropriate. Accordingly, even if the directions in which first straight portion 6a and second straight portion 6d extend are individually changed, first straight portion 6a and second straight portion 6d can be easily connected to each other with the curved portion.

Further, as shown in FIG. 1, first face 2 of cutting insert 1 includes flank face 31 continuous with main cutting edge 6. In flank face 31, first width W4 of the portion adjacent to first straight portion 6a can be set differently from second width W5 of the portion adjacent to second straight portion 6d. Accordingly, widths W4, W5 of flank face 31 can be adjusted according to the respective cutting conditions of first straight portion 6a and second straight portion 6d. Thus, main cutting edge 6 can provide high cutting performance as a whole.

Further, as shown in FIG. 6, when viewed from the second face 4 side, center C of the curvature radius of main cutting edge 6 is located on the third face 8 side relative to fixing hole 32. In this case, too, high cutting performance can be provided.

Further, the difference between first intersection angle $\theta 1$ and second intersection angle $\theta 2$ is 1° or more and 5° or less. In this case, the difference in position between first straight portion 6a and second straight portion 6d can be relatively small. Since the difference in position for which adjustment needs to be made at the curved portion is small, the curvature radius of the curved portion can be large to some degree. Accordingly, first straight portion 6a and second straight portion 6d can be smoothly connected to each other with a curved line having a large curvature radius. Consequently, a rough cutting face of a workpiece can be prevented.

Further, first intersection angle $\theta 1$ is 80° or more and 85° or less. In this case, in main cutting edge 6, sufficiently high strength can be provided to the edge of the area located adjacent to the boundary portion between first straight portion 6a and reference side 11. Also, first intersection angle $\theta 1$ is larger than second intersection angle $\theta 2$. Accordingly, the inclination angle of the cutting edge of second straight portion 6d can be larger than that of first straight portion 6a. Consequently, cutting performance can be enhanced.

(Embodiment 2)

As shown in FIGS. 7-10, cutting insert 1 according to the present embodiment has a configuration basically similar to that of cutting insert 1 shown in FIGS. 1-6. However, cutting insert 1 according to the present embodiment is different from cutting insert 1 shown in FIGS. 1-6 in that first face 2 does not have a separate flank face 31 (see FIG. 1) from the central portion, and in that the third face is a flat surface. Main cutting edge 6 of cutting insert 1 shown in FIGS. 7-10 is constituted of first straight portion 6a, curved portion, and second straight portion 6d as in FIG. 5. Further, as can be seen from FIGS. 7 and 8, the entire first face 2 is a flat surface.

Such a configuration can provide advantageous effects similar to those of cutting insert 1 shown in FIGS. 1-6.

<Configuration and Advantageous Effects of Modification>

Figure 11:
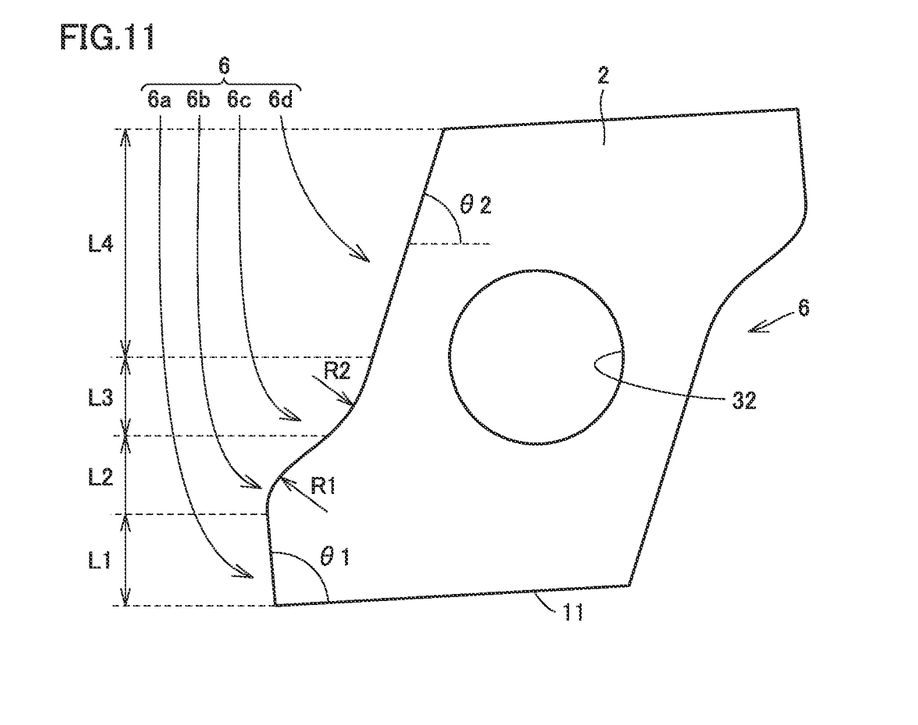
FIG. 11 is a schematic view for illustrating a configuration of a main cutting edge of a cutting insert according to Embodiment 3.

FIG. 11 is a schematic view for illustrating a modification of a cutting insert according to the present embodiment. FIG. 11 corresponds to FIG. 5.

The cutting insert shown in FIG. 11 has a configuration basically similar to that of the cutting insert shown in FIGS. 7-10. However, the cutting insert shown in FIG. 11 is different from cutting insert 1 shown in FIGS. 7-10 in that first intersection angle $\theta 1$ at first straight portion 6a of main cutting edge 6 is 90° or more, more specifically, more than 90°. First intersection angle $\theta 1$ in this case may be, for example, more than 90° and 100° or less. This can provide advantageous effects similar to those of cutting insert 1 shown in FIGS. 7-10, and can further enhance the edge strength around first straight portion 6a of main cutting edge 6. Note that such a configuration where first intersection angle $\theta 1$ is 90° or more or more than 90° may be applied to cutting insert 1 shown in FIGS. 1-6.

<Configuration and Advantageous Effects of Cutting Tool>

Figure 12:
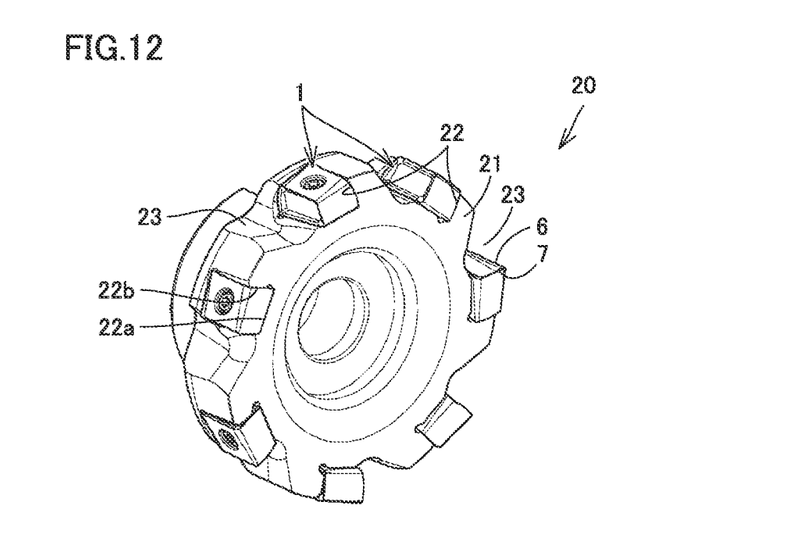
FIG. 12 is a schematic view for illustrating a configuration of a cutting tool.

FIG. 12 shows cutting tool 20 with cutting insert 1 shown in FIGS. 1-11. Cutting tool 20 shown in FIG. 12 is a milling cutter for shoulder milling. Cutting tool 20 includes cutter body 21 having an outer periphery, and includes cutting insert 1 described above. Cutting insert 1 is fixed to the outer periphery. Specifically, in the outer periphery of cutter body 21, a plurality of seating grooves 22 are formed. Cutter body 21 is rotatable about the axis of rotation. Seating grooves 22 are formed in the outer periphery located in the radial direction when viewed from the axis of rotation of cutter body 21. In the outer periphery of cutter body 21, swarf pockets 23 are formed to be adjacent to seating grooves 22. A plurality of seating grooves 22 and swarf pockets 23 are arranged at intervals along the direction of rotation of cutter body 21.

In each seating groove 22, cutting insert 1 is inserted. Cutting insert 1 is fixed to seating groove 22 with an attaching screw. The attaching screw is inserted in fixing hole 32 (see FIG. 1) of cutting insert 1 and is screwed into and fixed to a threaded hole (not shown) formed in the inner wall of seating groove 22.

For example, lower face 3 of cutting insert 1 is in contact with an inner face 22a of seating groove 22. Further, second face 4 of cutting insert 1 which is a side not involved in cutting is supported by an inner face 22b of seating groove 22.

Cutter body 21 rotates about the axis of rotation, thereby cutting a workpiece with main cutting edges 6 and sub cutting edges 7 of cutting insert 1.

According to such a configuration, with cutting insert 1 having both high edge strength and high cutting performance, cutting tool 20 can be provided that can perform highly efficient cutting with a large depth of cut at the time of cutting.

It should be construed that the embodiments disclosed herein are given by way of example in all respects, not by way of limitation. It is intended that the scope of the present invention is defined by claims, not by the above-described embodiments, and encompasses all modifications equivalent in meaning and scope to the claims.

REFERENCE SIGNS LIST

1: cutting insert; 2: first face; 3: lower face; 4: second face; 6: main cutting edge; 6a: first straight portion; 6b: first curved sub-portion; 6c: second curved sub-portion; 6d: second straight portion; 7: sub cutting edge; 8: third face; 11: reference side; 20: cutting tool; 21: cutter body; 22: seating groove; 22a, 22b: inner face; 23: swarf pocket; 31: flank face; 32: fixing hole

The invention claimed is:

1. A cutting insert comprising a main body, the main body including:
a first face;
a second face continuous with the first face and extending in a direction intersecting the first face; and
a third face continuous with the first face and the second face,
the first face having a fixing hole formed therein,
the second face including a rake face,
among outer-peripheral sides of the second face, a boundary portion with the first face being a main cutting edge,
when viewed from a side where the first face is disposed, the main cutting edge including:
 a first straight portion located adjacent to a reference side, the reference side being a boundary between the first face and the third face;
 a second straight portion arranged at a distance from the first straight portion; and
 a curved portion connecting the first straight portion and the second straight portion,
a first intersection angle of the first straight portion with respect to the reference side being different from a second intersection angle of the second straight portion with respect to the reference side,
wherein, when viewed from the side where the first face is disposed, the curved portion includes:
 a first curved sub-portion convex in a direction away from the fixing hole; and
 a second curved sub-portion convex toward the fixing hole.

2. The cutting insert according to claim 1, wherein, when viewed from the side where the first face is disposed, the first curved sub-portion and the second curved sub-portion are different from each other in curvature radius.

3. The cutting insert according to claim 1, wherein
the first face includes a flank face continuous with the main cutting edge, and
in the flank face, a first width of a portion adjacent to the first straight portion in a direction along the reference side is different from a second width of a portion adjacent to the second straight portion in the direction along the reference side.

4. A cutting insert comprising a main body, the main body including:
a first face;
a second face continuous with the first face and extending in a direction intersecting the first face; and
a third face continuous with the first face and the second face,
the first face having a fixing hole formed therein,
the second face including a rake face,
among outer-peripheral sides of the second face, a boundary portion with the first face being a main cutting edge,
when viewed from a side where the first face is disposed, the main cutting edge including:
 a first straight portion located adjacent to a reference side, the reference side being a boundary between the first face and the third face;
 a second straight portion arranged at a distance from the first straight portion; and
 a curved portion connecting the first straight portion and the second straight portion,
a first intersection angle of the first straight portion with respect to the reference side being different from a second intersection angle of the second straight portion with respect to the reference side,
when viewed from a side where the second face is disposed, the main cutting edge forms a curved line, and
when viewed from the side where the second face is disposed, a center of a curvature radius of the main cutting edge is located on a side where the third face is disposed relative to the fixing hole.

5. The cutting insert according to claim 1, wherein a difference between the first intersection angle and the second intersection angle is 1° or more and 5° or less.

6. The cutting insert according to claim 1, wherein the first intersection angle is 80° or more and 85° or less.

7. A cutting insert comprising a main body, the main body including:
a first face;
a second face continuous with the first face and extending in a direction intersecting the first face; and
a third face continuous with the first face and the second face,
the first face having a fixing hole formed therein,
the second face including a rake face, among outer-peripheral sides of the second face, a boundary portion with the first face being a main cutting edge,
when viewed from a side where the first face is disposed, the main cutting edge including:
  a first straight portion located adjacent to a reference side, the reference side being a boundary between the first face and the third face;
  a second straight portion arranged at a distance from the first straight portion; and
  a curved portion connecting the first straight portion and the second straight portion,
a first intersection angle of the first straight portion with respect to the reference side being larger than a second intersection angle of the second straight portion with respect to the reference side,
the first face including a flank face continuous with the main cutting edge,
in the flank face, a first width of a portion adjacent to the first straight portion in a direction along the reference side being different from a second width of a portion adjacent to the second straight portion in the direction along the reference side,
wherein, when viewed from the side where the first face is disposed, the curved portion includes:
  a first curved sub-portion convex in a direction away from the fixing hole; and
  a second curved sub-portion convex toward the fixing hole.

8. A cutting tool comprising;
a cutter body having an outer periphery; and
the cutting insert according to claim 1, the cutting insert being fixed to the outer periphery.

9. A cutting tool comprising:
a cutter body having an outer periphery; and
the cutting insert according to claim 7, the cutting insert being fixed to the outer periphery.

* * * * *